United States Patent [19]

Suzuki

[11] Patent Number: 4,847,762
[45] Date of Patent: Jul. 11, 1989

[54] ECR HAVING MEANS FOR ESTABLISHING A DATA FORMAT AND PROCESSING ENTERED DATA IN ACCORDANCE WITH AN ESTABLISHED DATA FORMAT

[75] Inventor: Yasuo Suzuki, Nagaokakyo, Japan

[73] Assignee: Omron Tateisi Electronics Co., Kyoto, Japan

[21] Appl. No.: 31,784

[22] Filed: Mar. 30, 1987

[30] Foreign Application Priority Data

Mar. 31, 1986 [JP] Japan .................................. 61-75353

[51] Int. Cl.$^4$ ............................................. G06F 15/21
[52] U.S. Cl. ................................................. 364/405
[58] Field of Search ......................... 364/709, 405, 900

[56] References Cited

U.S. PATENT DOCUMENTS

| | | | |
|---|---|---|---|
| 4,450,526 | 5/1984 | Nakatani et al. | 364/405 |
| 4,502,119 | 2/1985 | Tsuzuki | 364/405 |
| 4,508,962 | 4/1985 | Yamasaki | 364/405 X |
| 4,564,904 | 1/1986 | Kumagai | 364/405 |
| 4,607,334 | 8/1986 | Shiono et al. | 364/405 |
| 4,691,283 | 9/1987 | Matsuda et al. | 364/405 |
| 4,752,875 | 6/1988 | Takebayashi | 364/405 |
| 4,766,540 | 8/1988 | Mizuno | 364/405 |

*Primary Examiner*—Gary V. Harkcom
*Assistant Examiner*—Tan V. Mai
*Attorney, Agent, or Firm*—Stevens, Davis, Miller & Mosher

[57] ABSTRACT

A data input device can be adapted for setting a data format establishing mode or a data inputting mode in which the input data are processed on the basis of the established data format. The data input device includes a keyboard for establishing the data format in the data format establishing mode and for inputting data in the data inputting mode. The data format established by the keyboard is stored in a memory. The input device processes the input data on the basis of the data format stored in the memory.

4 Claims, 6 Drawing Sheets

| RECORD NO. | MESSAGE NO. | DATA TYPE CODE | DATA LENGTH CODE | OUTPUT SELECTION CODE | CONTINUING RECORD NO. |
|---|---|---|---|---|---|
| 1 | 1 | 2 | 2 | 10 | 2 |
| 2 | 2 | 4 | 6 | 10 | 3 |
| 3 | 3 | 2 | 5 | 10 | 4 |
| 4 | 4 | 2 | 12 | 10 | 5 |
| 5 | 5 | 2 | 2 | 10 | 6 |
| 6 | 6 | 1 | 4 | 10 | 7 |
| 7 | 7 | 1 | 5 | 11 | 8 |
| 8 | 8 | 3 | 3 | 10 | 9 |
| 9 | 9 | 3 | 5 | 10 | 4 |

FIG. 5

| | | | 44 |
|---|---|---|---|
| 1 | BUSINESS CODE | ( X X ) | |
| 2 | DATE CODE | ( Y Y M M D D ) | |
| 3 | SLIP NO. | ( 5 DIGITS ) | |
| 4 | ITEM CODE | ( 12 DIGITS ) | |
| 5 | INVENTORY VOLUME | ( 2 DIGITS ) | |
| 6 | UNIT PRICE | ( 4 DIGITS ) | |
| 7 | SUBTOTAL | ( 5 DIGITS ) | |
| 8 | UNIT WEIGHT | ( . X X X kg ) | |
| 9 | SUBTOTAL WEIGHT | ( X X . X X X kg ) | |

FIG. 6
| ITEM CODE | VOLUME (PIECES) | UNIT PRICE (YEN) | SUBTOTAL (YEN) | UNIT WEIGHT (kg) | SUBTOTAL WEIGHT (kg) |
|---|---|---|---|---|---|
| | | | BUSINESS CODE : 01 | | |
| DATE : 870330 | | | SLIP NO. :003 | | |
| 123456789012 | 5 | 1000 | 5000 | 200 | 1.000 |
| 987654321098 | 10 | 550 | 5500 | — | — |
FIG. 7
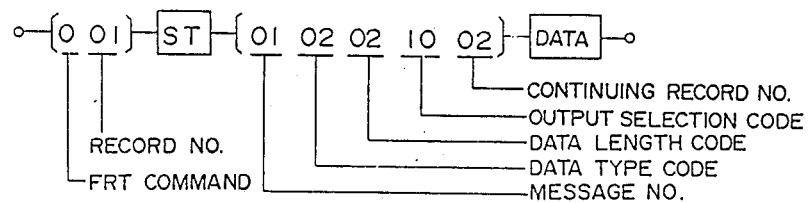
- RECORD NO.
- FRT COMMAND
- CONTINUING RECORD NO.
- OUTPUT SELECTION CODE
- DATA LENGTH CODE
- DATA TYPE CODE
- MESSAGE NO.
FIG. 8
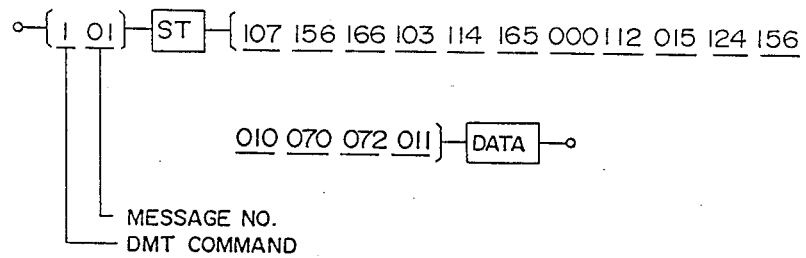
- MESSAGE NO.
- DMT COMMAND

FIG. 9
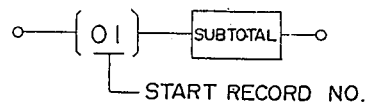
START RECORD NO.
FIG. 10
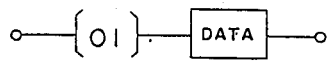
FIG. 11
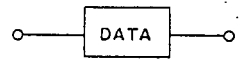
FIG. 12
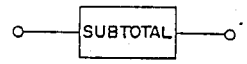
FIG. 13
```
                           60
(01)                       01
(02)                   610210
(03)                      003
(04)             123456789012
(05)                        5
(06)                     1000
(07)                     5000
(08)                     .200
(09)                    1.000
(04)             987654321098
(05)                       10
(06)                      550
(07)                     5500
(08)
(09)
TOTAL                   10500
```

ECR HAVING MEANS FOR ESTABLISHING A DATA FORMAT AND PROCESSING ENTERED DATA IN ACCORDANCE WITH AN ESTABLISHED DATA FORMAT

BACKGROUND OF THE INVENTION

1. Field of the Invention

This invention relates to a date input device, and more particularly to a computer operated data input device which has a data format establishing mode and a data inputting mode. The input data can be processed on the basis of the established data format. The data input device according to this invention can be applied to electronic cash registers (ECRs) and inventory control machines.

2. Discussion of the Prior Art

There is well known a data input device for use with ECRs which have such functions as data setting, report issuing, and ordinary item registration. The data setting includes setting of commodity titles and prices in a table provided within ECRs. The report issuing is carried out to produce a list of sales data of a day. The ordinary item registration is carried out to register the department codes or item codes of items sold together with the sales amount. These functions are performed by the use of a keyboard, printer, display, memory, and CPU which are all provided in ECRs.

Heretofore, when an operator wanted to know the total volume of stock items according to an inventory list, he had to calculate it using a calculator because ECRs work no more than to operate on the basis of predetermined computer programs. The conventional ECRs had to go through modifications in terms of computer programs if required to function as calculators for calculating the total volume of stock items.

SUMMARY OF THE INVENTION

It is an object of this invention to provide a data input device for use with ECRs, inventory control machines, and so on, capable of performing functions on the basis of a data format which can be preset using a keyboard. According to one aspect of this invention, there is provided a data input device comprising a mode setting switch for setting a data format establishing mode or a data inputting mode in which the input data are processed on the basis of the established data format, a keyboard for establishing the data format in the data format establishing mode and for inputting data in the data inputting mode, a memory for storing the data format established by the use of the keyboard, and a CPU for processing the input data in the data inputting mode on the basis of the data format stored in the memory.

Other objects and numerous advantages of the data input device according to this invention will become apparent from the following description when considered in conjunction with the accompanying drawings.

BRIEF DESCRIPTION OF THE DRAWINGS

FIG. 5 is a schematic view showing the memory location layout of a message table of FIG. 3;

FIG. 6 is a schedule showing an inventory list;

FIG. 7 is a schematic view illustrating the key sequence for storing a data format in the data format table 43 of FIG. 4;

FIG. 8 is a schematic view illustrating the key sequence for inputting a message in a message table 44 of FIG. 5;

FIGS. 9 to 12 show key operations in the key inputting mode;

FIG. 13 shows a slip printed by a printer of FIG. 1; and

DETAILED DESCRIPTION OF THE INVENTION

Figure 1:
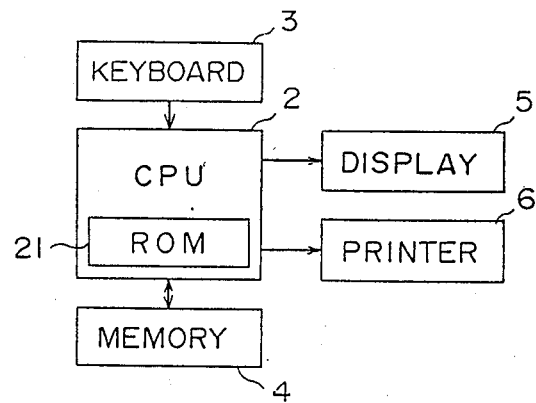
FIG. 1 is a block diagram showing an ECR to which a data input device of this invention is applicable.

An embodiment of this invention will now be described with reference to an ECR 1 shown in FIG. 1, in which a CPU 2 has connected thereto a keyboard 3, a memory 4, a display 5, and a printer 6 respectively. The CPU 2 includes therein a ROM 21 for storing operation programs therefor. The keyboard 3 includes a mode setting switch and keys for inputting a data format and data to be processed by CPU 2. It should be noted that this ECR includes two modes; data format establishing mode for establishing the data format by an operator and data inputting mode for inputting data which are processed on the basis of the data format.

The memory 4 stores the data format entered from keyboard 3 in the data format establishing mode, which will be detailed later in FIG. 3. The display 5 gives messages shown in FIG. 5 to an operator in the data inputting mode. The printer 6 prints data to be printed in the data inputting mode, when CPU 2 judges so, on the basis of print information included in the data format.

The CPU 2 stores in memory 4 the data format entered from keyboard 3 in the data format establishing mode and reads the data format from memory 4 to process input data based on the data format in the data inputting mode.

Figure 2:
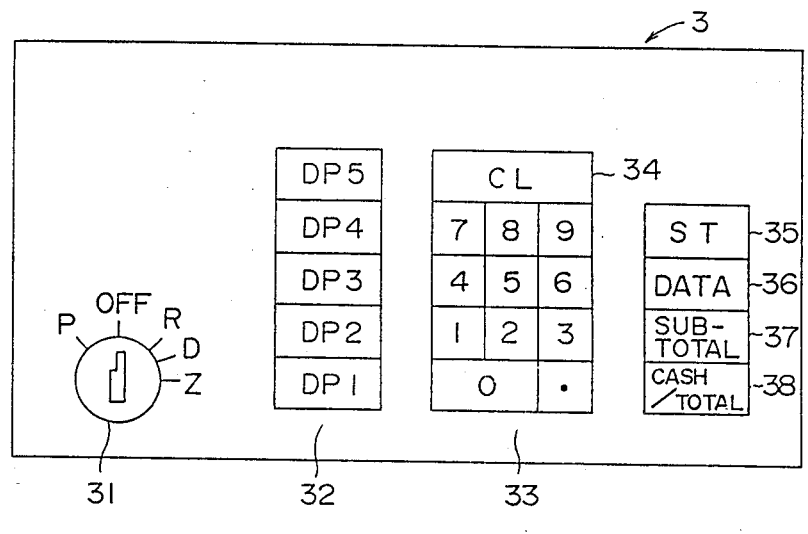
FIG. 2 is a plan view showing a beyboard of FIG. 1.

Referring to FIG. 2 showing the key layout of keyboard 3, provided are a mode switch 31 for selecting a mode, department keys 32, numeral keys 33, a clear key 34, a ST key 35, a data key 36, a subtotal key 37, and a Cash/Total key 38. The mode switch 31 can select such modes as a registration mode (R mode), a report mode (Z mode) for issuing a report, a program mode (P mode) for establishing the data format, and a data mode (D mode) for inputting data to be processed.

The department keys 32 are provided for entering the department codes of items in the registration mode. The numeral keys 33 are depressed for entering price data in the registration mode, for establishing the data format in the program mode, and for inputting data to be processed in the data mode. The clear key 34 is used to clear the data entered by the numeral keys 33. The ST key 35 and data key 36 are used to delimit the data format and input data to be processed in the program mode and data mode.

The subtotal key 37 is used to calculate the total amount of registered items in the registration mode, also is used to terminate data inputting in the data mode. The cash/total key 38 is used for payment operation in the registration mode.

Figures 3, 4:
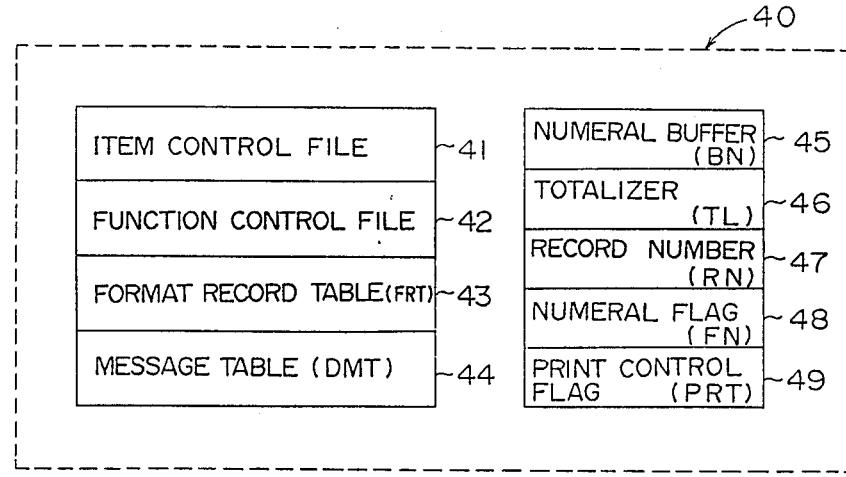
FIG. 3 is a schematic view showing the memory location layout of a memory of FIG. 1.
FIG. 4 is a schematic view showing the memory location layout of a format record table 43 of FIG. 3.

In FIG. 3, the configuration of memory 4 is shown, comprising item control file 41, function control file 42, format record table 43, message table 44, numeral data buffer 45, totalizer 46, record number storage area 47, numeral flag storage area 48, and print control flag storage area 49. A detailed explanation is not given for item control file 41 and function control file 42, because they are solely used in the registration mode and report mode not related to this invention. The format record table 43 and message table 44 are explained on the detailed basis later in FIGS. 4 and 5.

The numeral buffer 45 is used for temporarily storing the data format and input data to be processed entered from numeral keys 33. The totalizer 46 accumulates data directed to be accumulated in the data inputting mode. The record number storage area 47 stores record numbers entered from numeral keys 33. The numeral flag storages area 48 stores a flag which is set responsive to entry of numeral data from numeral keys 33. The print control flag storage area 49 stores a flag which is set according to directions for printing in the data inputting mode.

In FIGS. 4 and 5, an example of data format and message data is shown respectively for better understanding of this invention. A single data format consists of a message number, a data type code, a data length code, an output selection code, and a continuing record number. In the data format establishing mode (P mode), a data format entered from keyboard 3 is stored in format record table 43 in the order of record number, thus establishing a single record. The message number here is identical with that of message table 44 shown in FIG. 5, format record table 43.

When entering a data with record number 1 in the data inputting mode, display 5 presents a guide message, saying "business code (XX)." The data type code indicates the nature of data; codes "1", "2", "3", and "4" respectively denote money data, integral data, numeral data with a decimal point, and date data. The data length code defines the maximum digits of numeral data to be input. The output selection code teaches where to output data. This code includes two digits; the first digit gives the print information indicating whether or not to output data into printer 6 and the second digit gives the information indicating whether or not to output data into totalizer 46. In each digit as described above, "1" indicates to output data, while "0" denotes to the contrary.

The continuing record number indicates the record number to be followed. FIG. 5 shows a message table in which a variety of messages are stored along with the respective message numbers.

An inventory list is shown in FIG. 6. The description hereinafter is concerned with the procedure of handling the inventory list shown in FIG. 6.

In this embodiment, it should be assumed that an operator of ECR 1 wants to input nine kinds of data as shown in the inventory list such as business code, date code, slip number, item code, volume data, unit price, subtotal, unit weight, and subtotal weight and further he wants to accumulate the subtotal. As an example of data entry, let it be assumed that data are input in the order of the inventory list.

One data corresponds to one record of format record table 43 shown in FIG. 4; record numbers 1, 2, 3, 4, 5, 6, 7, 8, and 9 respectively correspond to business code, date code, slip number, item code, volume data, unit price, subtotal, unit weight, and subtotal weight. It should be noted that the business code, date code, and slip number are single-formed data respectively, while inventory item data i.e., item code to subtotal weight need to be repeatedly input.

In this embodiment, as to record numbers 1 to 8, the subsequent record numbers are respectively stored in the continuing record number storage areas. However, the continuing record number storage area of record number 9 which corresponds to the subtotal weight has stored therein record number "4" which indicates item code. As shown in FIG. 5, message table 44 stores the respective data titles which are displayed to let the operator confirm as to which data to be entered in the data inputting mode.

FIG. 7 shows the key operation for inputting a data format into format record table 43 shown in FIG. 4. In the key input operation, following to the entry of a command code for data format table (FRT) establishment and record number using numeral keys 33, ST key 35 is pressed. Following this, a message number, a data type code, a data length code, an output selection code, and a continuing record number are entered in such order, and finally data key 36 is pressed.

FIG. 8 shows the key operation in the P mode for entering messages into message table 44 shown in FIG. 5.

As shown in FIG. 8, following to the entry of a command code for message table (DMT) establishment and a message number using numeral keys, ST key 35 is pressed. Following this, character codes corresponding to the message are entered from numeral keys 33, and finally data key 36 is pressed.

The key operations for entering data in the data inputting mode are shown in FIGS. 9 to 12. FIG. 9 shows the entry of a record number of format record table 43 in which subtotal key 37 is pressed, following to the entry of a start record number. FIG. 10 shows the entry of data subsequent to the entry of the record number, in which data key 36 is pressed following to the entry of data from numeral keys 33. FIG. 11 shows the key operation in case that no data is provided for the record number. In this case, data entry can be skipped by merely pressing data key 36.

FIG. 12 shows a key operation for terminating the data entry, in which subtotal key 37 is solely pressed without operating numberal keys 33.

When entering data in accordance with an inventory list shown in FIG. 6, a slip is printed and issued by printer 6 as shown in FIG. 13.

On the slip 60 shown in FIG. 13, printed are respective volumes, unit prices, subtotals, unit weights, and subtotal weights in respect of item codes "123456789012" and "987654321098" along with business code, date code, and slip number. Further, in this embodiment, subtotal is subject to accumulation and print-out, so that the accumulated amount of subtotal "10500" is printed out as total amount. In this way, an operator of ECR 1 can perform data inputting operation in regard to the inventory list shown in FIG. 6.

Figure 14:
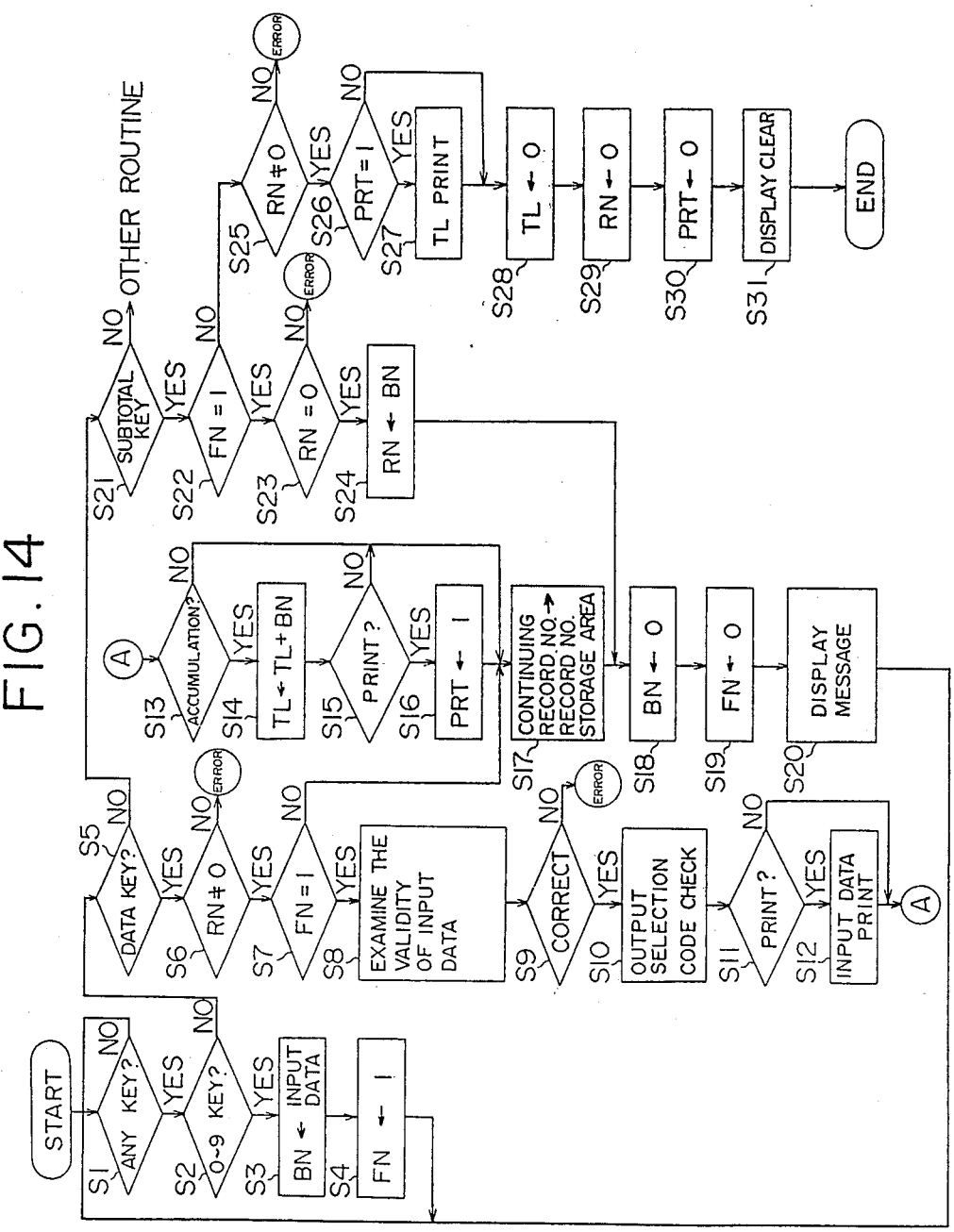
FIG. 14 is a flowchart illustrating the data input operations shown in FIGS. 9 to 12.

FIG. 14 is a flowchart illustrating the operation of CPU 2 in accordance with data input operations as shown in FIGS. 9 to 12. First, data inputting operation is described hereinafter.

The start record number is entered from numeral keys 33 (FIG. 9). In steps 1 and 2, it is inquired if any key is entered. The program advances to step 3, because numeral keys have been operated in this case. The numeral data are stored in numeral buffer BN in step 3, and numeral flag FN is set in step 4. Following this, the program returns to step 1.

Next, subtotal key 37 is depressed, which causes the program to advance to step 5 where it is inquired if data key 36 is entered. Since data key is not pressed here, the program advances to step 21 where it is inquired if subtotal key 37 is pressed.

The program goes to step 22, because subtotal key 37 is pressed here. In step 22, it is inquired if numeral flag FN is set. Since FN is set, the program goes to step 23 where it is inquired if record number RN is 0. The program goes to step 24, because record number has not yet been stored in record number storage area 47 although it is in numeral buffer BN. In step 24, the data stored in numeral buffer BN are transferred to record number storage area 47 and stored therein.

Subsequently, the program advances to step 18 where numeral buffer BN is zeroed and to step 19 where numeral flag FN is reset. In step 20, the message correponding to the message number of record number RN is read out of message table 44 and displayed at display 5. After then, the program goes back to step 1.

Next, the data input operations as shown in FIG. 10 are described. First, numeral data are entered using numeral keys 33, which are followed by the operations shown in steps 1 to 4. Upon the entry of data key 36, the program goes from step 2 to step 5 where the entry of data key 36 is confirmed. Then, in step 6, the presence of record number is confirmed, because the start record number has already been stored in record number storage area 47 in step 24. Thus, the program goes to step 7 where it is inquired if numeral flag FN is set.

Since numeral flag FN has already been set in step 4, the program goes to step 8. In step 8, the validity of input data is judged in view of the data type and data length of the corresponding record of format record table 43. In step 9, if input data is judged to be valid, the program goes to step 10 where the output selection code is examined. If the selection of print-out is confirmed in step 11, the input data are printed in step 12.

In step 13, it is also inquired if the input data should be accumulated in view of the output selection code. The program skips into step 17, unless the data are subject to accumulation. If the accumulation is confirmed, the program goes to step 14 where the data are accumulated in a totalizer TL. Following this, it is inquired in step 15 whether print code is set with respect to the accumulated data. If yes, a print control flag PRT is set in step 16. Subsequently, in step 17, the continuing record number of the processing record number is transferred to record number storage area 47 and stored therein. After then, in steps 18 and 19, numeral buffer BN and numeral flag FN are reset respectively, which is followed by step 20 where the message corressponding to message number of the renewed record number is read out of message table 44 to be displayed for operator's guidance.

Next, the operations without input data shown in FIG. 11 are described. In these operations, data key 36 is pressed without the entry of numeral keys 33, so that the program advances from step 1 to step 5 through step 2. Since numeral flag FN is not set, the program skips to step 17 through step 7. The subsequent operations are equivalent to the data input operations previously described.

The operations for terminating data inputting as shown in FIG. 12, are described as follows:

Upon the depression of subtotal key 37, the program advances from step 1 to step 21 through steps 2 and 5. In this case, since flag FN is not set, the program goes to steps 25 and 26. In step 26, it is inquired if print control flag PRT is set. If PRT is set, the data stored in totalizer TL is printed in step 27. Following this, in steps 28, 29, 30, and 31, totalizer TL, record number RN, print control flag PRT, and display 5 are respectively reset or zeroed.

According to this invention, the programs for controlling the input operations are restricted to those for checking the validity of input data, so that the programs would be rather simple and easy to handle. Further, an operator can flexibly determine the data to be set in each format record and the input sequence which is to be specified in the continuing record number, thus allowing the user of a data input device according to this invention to have the format of his own.

In the above embodiment, the data to be handled are numeral data, however, it should be noted that character data may be included as a type of data to improve the data processing.

Although an exemplary embodiment of the invention has been shown and described, it should be apparent that many modifications can be made without departing from the spirit and scope of the invention.

What is claimed is:

1. A data input device comprising:
   mode setting means for setting either (a) a data format establishing mode or (b) a data inputting mode in which data which are input during said data inputting mode are processed on the basis of a previously established data format,
   data input means for establishing a data format when said mode setting means sets said data format establishing mode and for inputting data when said mode setting means sets said data inputting mode,
   storage means for storing said data format established by said data input means, and
   processing means for processing data which are input in said data inputting mode on the basis of said data format stored in said storage means.

2. A data input device according to claim 1, wherein said data format includes therein information indicative of printing the input data, and said processing means, based on the print information included in said data format, processes data input by said data input means during said data inputting mode so that said data input is printed.

3. A data input device according to claim 1, wherein said data format includes therein information indicative of accumulating input data, and said processing means, based on the accumulation information included in said data format, processes the data input by said data input means during said data inputting mode so that said data input is accumulated.

4. A data input device according to claim 1, wherein said data format includes therein information indicative of linking to any other data format stored in said storage means, and said data processing means processes the data input by said data input means during said data inputting mode based on the data format to be linked.

* * * * *